DONALD R. BOERNER
WALTER J. KRUPICK
HUGH E. RIORDAN
INVENTORS

BY
Thomas W. Kennedy
ATTORNEY

DONALD R. BOERNER
WALTER J. KRUPICK
HUGH E. RIORDAN
INVENTORS

BY

*Thomas W. Kennedy*
ATTORNEY

Sept. 1, 1970     D. R. BOERNER ET AL     3,526,145
ACCELERATION INTEGRATING GYRO Filed March 26, 1965     3 Sheets-Sheet 3

DONALD R. BOERNER
WALTER J. KRUPICK
HUGH E. RIORDAN
INVENTORS

BY

*Thomas W. Kennedy*
ATTORNEY

United States Patent Office 3,526,145
Patented Sept. 1, 1970

3,526,145
ACCELERATION INTEGRATING GYRO
Donald R. Boerner, Wayne, Walter J. Krupick, Succasunna, and Hugh E. Riordan, Wyckoff, N.J., assignors to Singer-General Precision, Inc., a corporation of Delaware
Filed Mar. 26, 1965, Ser. No. 443,035
Int. Cl. G01c *19/28, 19/30*
U.S. Cl. 74—5.46                                3 Claims

ABSTRACT OF THE DISCLOSURE

An acceleration integrating gyro has a rotor which is rotatable about a first axis, a float gimbal which is pivotable about a second axis that intersects the first axis substantially at right angles thereto, a casing gimbal which is pivotable about a third axis that is disposed substantially at right angles to said second axis, and a support gimbal which has an axis parallel to the third axis. The float gimbal has a peripheral wall which is coaxial with the rotor along the first axis with means supporting the rotor for rotation of the rotor about the first axis, and has a pair of end walls axially-spaced along the first axis, forming a cavity for enclosing the rotor. The rotor and the float are offset from the second axis for making the float pendulous about the second axis. The casing gimbal has a peripheral wall which is concentric about the third axis with pivot means supporting the float for pivoting the float relative to the casing about the second axis, and has a pair of end walls axially-spaced along the third axis forming a cavity for containing a damping fluid for immersing the float therein. The support gimbal has pivot means for pivoting the casing relative to the support gimbal about the third axis.

---

The present invention relates to gyroscopes, and particularly to acceleration integrating gyroscopes.

A prior-art acceleration integrating gyro for a vehicle comprises a conventional, single-axis gyro unit coaxially mounted on a support gimbal. The gyro unit comprises a rotor with a Y-axis, a cylindrical float for enclosing the rotor, which is concentric about and which pivots about an X-axis, that is substantially at right angles to the Y-axis, and a cylindrical casing, which is also concentric about the X-axis for enclosing and pivotally supporting the float, and which pivots about a Z-axis, that is substantially at right angles to the X-axis and intersects the X-axis and the Y-axis. The casing is pivotally supported by the fixed gimbal for pivoting about the Z-axis. The rotor or other mass is offset from the X-axis whereby the float is pendulous about the X-axis. In this way, an acceleration force acting parallel to the Z-axis, causes the float to rotate about the X-axis. This rotation is sensed electically, and a corresponding torque applied to the casing about the Z-axis. This torque causes a rotation about the Z-axis, which through gyroscopic precession restores the float to the null position. The rate of rotation of the casing relative to the fixed gimbal is proportional to the amount of the acceleration force applied to the gyro and its vehicle; and the net angle of rotation of the casing relative to the fixed gimbal is proportional to the change in velocity of the gyro and its vehicle.

One problem with the prior-art acceleration integrating gyro is the difficulty in reducing the ratio of float weight to float pendulosity and also the difficulty in reducing the ratio of the rotor weight to rotor momentum, in order to decrease the gyro spin speed without reducing the gyro stability, accuracy, and performance. Reduced spin speed is desirable to provide longer operating life.

In accordance with one embodiment of the present invention, the float weight to pendulosity ratio is minimized, and rotor weight to momentum ratio is minimized by making the cylindrical float concentric about the Y-axis instead of concentric about the X-axis. With this construction, the float pendulosity can be increased, and the size and momentum of the rotor can be increased without increasing the weights of the float and rotor.

Accordingly, it is one object of the invention to provide an acceleration integrating gyro, in which the ratio of gyro weight to the gyro level of stability, accuracy and performance is minimized.

It is another object of the invention to provide an acceleration integrating gyro, in which the ratio of the float weight to the float pendulosity is minimized.

It is a further object of the invention to provide an acceleration integrating gyro, in which the ratio of the rotor weight to the rotor momentum is minimized.

It is a further object of the invention to provide an acceleration integrating gyro, according to the aforementioned objects, which has a capacitive pickoff means for measuring pivotal displacement of the gyro float relative to the gyro casing.

It is a still further object of the invention to provide an acceleration integrating gyro in which a frictionless flexure pivot suspension is used to locate the axis of rotation of the float.

To the fulfillment of these and other objects, the invention provides an acceleration integrating gyro comprising a rotor which is rotatable about a Y-axis, a float gimbal which is pivotable about an X-axis that intersects the Y-axis substantially at right angles thereto, a casing gimbal which is pivotable about a Z-axis that is disposed substantially at right angles to said X-axis, and a support gimbal which has an axis parallel to the Z-axis. The float gimbal has a peripheral wall which is coaxial with the rotor along the Y-axis with means supporting the rotor for rotation of the rotor about the Y-axis, and has a pair of end walls axially-spaced along the Y-axis, forming a cavity for enclosing the rotor. The rotor and the float are offset from the X-axis for making the float pendulous about the X-axis. The casing gimbal has a peripheral wall which is concentric about the Z-axis with pivot means supporting the float for pivoting the float relative to the casing about the X-axis, and has a pair of end walls axially-spaced along the Z-axis forming a cavity for containing a damping fluid for immersing the float therein. The support gimbal has pivot means for pivoting the casing relative to the support gimbal about the Z-axis.

Other objects of the invention will become apparent upon reading the annexed detailed description in connection with the drawings wherein like parts are designated by like numerals throughout the several views, and wherein.

Figure 1:
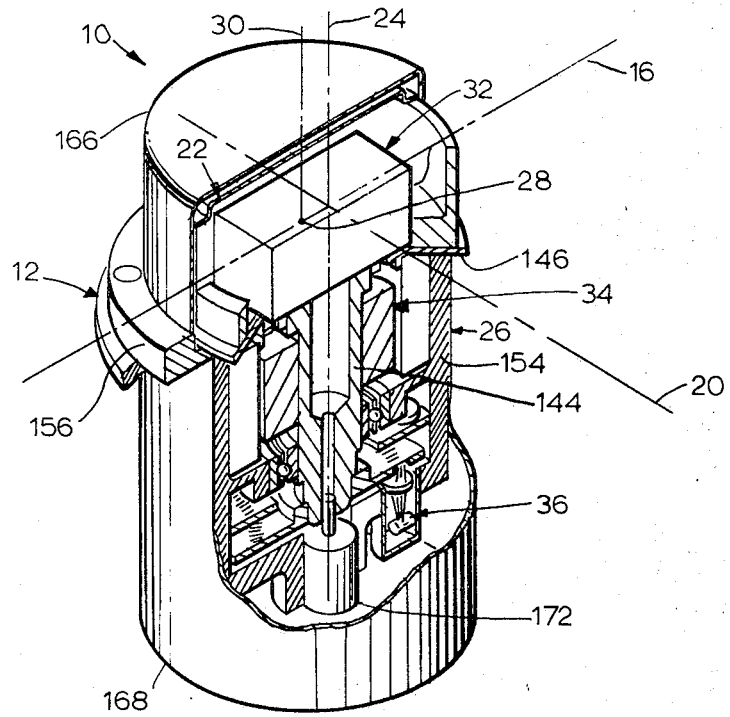
FIG. 1 is a schematic cut-away perspective view of an acceleration integrating gyro according to the present invention.

Referring to the drawings, one embodiment of the present invention is an acceleration integrating gyro 10, which is mounted in a vehicle 12. Gyro 10 comprises a rotor 14, which is rotatable about a Y-axis or spin axis 16; an inner gimbal or float 18, which pivotally supports rotor 14 for rotation or rotor 14 relative to float 18 about Y-axis 16, and which is pivotable about an inner gimbal pivot axis or X-axis 20, that intersects Y-axis 16 substantially at right angles thereto. Gyro 10 also comprises a middle gimbal or casing 22, which pivotally supports float 18 and which contains damping fluid (not shown) in which float 18 is immersed, and which is pivotable about a middle gimbal pivot axis or Z-axis 24 that intersects X-axis 20 and Y-axis 16 and which is disposed substantially at right angles to said X-axis 20. Gyro 10 also comprises an outer gimbal or platform support 26, which supports casing 22 and which pivots casing 22 about Z-axis 24 and which is fixedly connected to vehicle 12. Rotor 14 and float 18 have a common center of gravity 28, which is located substantially on Y-axis 16 and which is offset a substantial amount from X-axis 20 so that float 18 has a pendulous torque about X-axis 20; and have a reference A-axis or acceleration-sensing axis 30, which extends through center of gravity point 28 and is arranged substantially parallel to Z-axis 24.

Casing 22 supports a null-seeking pickoff means 32, which continuously senses the pivotal displacement and hang-off angle of float 18 relative to casing 22 about X-axis 20, that is caused by the acceleration component along A-axis 30. Platform 26 supports a torquer means 34, which is controlled by pickoff 32. Torquer 34 rotates casing 22 about Z-axis 24 and causes float 18 to precess about X-axis 20 in order to return float 18 to its null position when displaced by said acceleration along A-axis 30. Each such restoring precession of float 18 is accompanied by a corresponding additive angular displacement of casing 22 relative to platform 26. Platform 26 also supports a digital transducer 36, which continuously records such angular displacements. With the construction of gyro 10, the rate of rotation of casing 22 relative to platform 26 is proportional to said acceleration applied to gyro 10 and vehicle 12, and the net angle of rotation of casing 22 relative to platform 26 is proportional to the change in velocity of gyro and vehicle 12. In this way, gyro 10 can be used to indicate the instantaneous velocity of vehicle 12.

Rotor 14 has a flywheel 38, which is coaxial with float 18 along Y-axis 16. Flywheel 38 has a bore 40 receiving a ball bearing 42, which is journaled on a rotor shaft 44. Shaft 44 has an enlarged end portion 46, which is fixedly connected to a float 18 for supporting flywheel 38 therefrom. Ball bearing 42 has an inner race 48, which is journaled on shaft 44 and an outer race 50, which is journaled in flywheel 38. Outer race 50, which has an umbrella-like shape and which has a U-shaped cross-section, forms an annular space 52 concentric about Y-axis 16.

Rotor 14 also has an annular motor stator 54, which is also coaxial with float 18 along Y-axis 16. Stator 54 has an iron core 56 wrapped with field coils 58. Stator 54 is received in annular space 52 for cooperation with outer race 50. Shaft end portion 46 supports a cylindrical flange 60, which is also received in space 52 for supporting stator 54.

Float 18 has a cylindrical peripheral wall 62 concentric about Y-axis 16, and a pair of axially-spaced, substantially-flat end walls 64, 66, which form a cylindrical substantially leak-proof cavity 68 for enclosing rotor 14. Wall 64 is slightly dished to increase the float pendulosity. Wall 66 has a flat face 70 on its axially outer side whereby float 18 has a substantially-rectangular profile in a longitudinal cross-section parallel to Y-axis 16. Peripheral wall 62 has an intermediate wall 72, which is disposed in cavity 68 and which extends transverse to Y-axis 16 for supporting rotor shaft 44 from peripheral wall 62. In this way, float 18 and rotor 14 form a substantially integral structure.

Peripheral wall 62 also has a pair of shoulders 74, 76 extending in a radially outward direction substantially parallel to X-axis 20. Shoulders 74, 76 respectively have a pair of flexure bars 78, 80, which are fixedly connected thereto, and which extend alongside and substantially parallel to peripheral wall 62. Flexure bars 78, 80 are axially spaced along and are disposed transverse to X-axis 20. Bars 78, 80 have respective necked-down sections 82, 84 with respective hinge axes 86, 88, which are substantially co-linear with X-axis 20 for pivoting float 18 relative to casing 22 about X-axis 20.

Flexure bar 80 also has two additional necked-down sections 90, 92 disposed on either side of section 84. Sections 90, 92 have respective substantially parallel hinged axes 94, 96. A plane including axes 94, 96 is substantially at right angles to its hinge axis 88 and to X-axis 20.

With this construction, float 18 can expand and contract relative to casing 22 when subjected to temperature changes caused by rotor heat. In this way, a temperature-induced axial load on the integral structure of peripheral wall 62, rotor 14 and flexure bars 78, 80 is minimized. In addition, similar loads caused by tolerance buildup during assembly of parts 62, 14, 78, 80 are minimized. Thus, slight distortions of X-axis 20 and Y-axis 16 are minimized whereby gyro sensitivity is improved.

Flexure bars of the aforementioned type are more fully described in co-pending U.S. application, Ser. No. 331,613, filed Dec. 18, 1963 now Pat. No. 3,290,949 assigned to the same assignee as in this invention.

With the rectangular shape of float 18, damping of float 18 is more effective due to the pumping action instead of the shearing action between the fluid (not shown) and float 18. With the integral structure of float 18, rotor 14, and flex bars 78, 80, and with the construction of flexure bars 78, 80, relative distortion between X-axis 20 and Y-axis 16 is minimized thereby reducing gyro drift error.

Wall 66 has an opening 98, which is overlapped on the axially inner side thereof by a cup-shaped wall portion 100, which forms a recess 102 in the axially-outer side thereof. Cup 100 has a peripheral wall 104 of cylindrical shape, which is concentric about Y-axis 16 and end wall 106, which closes the axially inner end of recess 102 so that cup 100 forms a substantially leak-proof partition between recess 102 and cavity 68 for preventing flow of damping fluid therethrough. Cup 100 supports a balancing means 108, which is disposed in recess 102 for balancing float 66 about X-axis as explained hereafter.

Casing 22 has a cylindrical peripheral wall 110 concentric about X-axis 24, and a pair of axially-spaced flat end walls 112, 114 forming a cylindrical, substantially leak-proof cavity 116 containing damping fluid (not shown), in which float 18 is immersed. With the cylindrical shape of casing 22, the volume required in revolving of casing 22 about Z-axis 24 is utilized to a maximum extent thereby minimizing gyro weight-to-performance ratio. Wall 110 has a pair of clamp portions 118, 120 disposed in cavity 116, parallel to Y-axis 16 and arranged alongside float 18. Clamps 118, 120 are respectively connected to flex bars 78, 80 and are respectively disposed opposite shoulders 74, 76.

Balance means 108 includes a hollow sleeve 122, which is coaxially threaded into recess 102 for connection thereto. Sleeve 122 has a coaxial spring-like preload nut 124, which has an elongate balance screw 126 threaded therein that is adjustable relative to sleeve 122 for balancing float 18 about X-axis 20. Recess 102 also contains a balance weight 128, for neutralizing buoyancy.

Balance screw 126 has a T-shaped end portion 130, which is engaged by a fork-like rotatable adjuster screw 132, which is supported by casing 22.

Casing wall 110 has a diametrically-stepped bore 134, which is disposed adjacent balance means 108 and which is coaxial with screw 126 along Y-axis 16. Screw 132, which is received by bore 134 and is rotatable relative thereto about Y-axis 16, is positioned by a retaining ring 136 therein. Screw 132 has a seal ring 138 for minimizing leakage of damping fluid. Screw 132 has a pair of tines 140, 142, which are substantially parallel to Y-axis 16 and which are disposed on opposite sides of end 130 of screw 126 for turning balance screw 126 and for balancing float 18 without disturbing the damping fluid. With the construction of balance means 108, float 18 can be subsequently balanced from the exterior of gyro 10 after assembly, without disturbing the damping fluid surrounding float 18.

Platform 26 has a hollow shaft 144, which is coaxial with casing 22 for pivoting casing 22 about Z-axis 24. Shaft 144 has an integral table plate 146 at one end thereof. Plate 146 has three equi-spaced, axially-outwardly-projecting pads 148 with respective bolts 150 providing a tripod-type mounting for casing 22 on plate 146 and for providing ease of aligning casing 22 and shaft 144 along Z-axis 24. Wall 112 and plate 146 has oppositely-facing portions adjacent pads 148 which are separated by a uniform gap 152.

Platform 26 has a cylindrical peripheral wall 154, which is coaxial with shaft 144 and concentric about Z-axis 24. Wall 154 has an annular outer flange 156 on its radially outer side connecting to vehicle 12. Wall 154 also has a pair of axially-spaced inner, annular, L-shaped flanges 158, 160 on its radially inner side, which respectively support a pair of ball bearings 162, 164 that support shaft 144 from wall 154 for rotation relative thereto. Wall 154 also has an axially spaced upper cap 166 and a lower cap 168 which are fixedly connected to opposite ends thereof forming a housing for enclosing casing 22, torquer 34 and transducer 36. In one sample of embodiment 10, the overall size of gyro 10 is about two inches in diameter by two inches long.

Platform 26 has an end plate 170, which is connected to and which closes the axially outer end of wall 154 and which supports a brush block 172 that has a feed conduit (not shown) for supply of power to gyro 10. Block 172 is coupled to an inner slip ring rotor 174, which is coaxially fixed to the end of shaft 144 and which has leads 176 extending through hollow shaft 144 to casing 22 for connection to rotor 14 and pickoff 32.

With the construction and shape of casing 22 and platform 26, a tripod-type mounting can be easily provided therebetween for ease of accurate aligning of shaft 144 and casing 22 along Z-axis 24.

Pickoff 32 includes a capacitor plate 178, which is mounted on the radially inner surface of wall 110 facing float face 70. Plate 178 includes a substrate or back-up board 180, which is preferably made of glass or ceramic material, or the like. Plate 178 also includes a pair of conductive films 182, 184 of rectangular shape, which have respective terminals 186, 188. Films 182, 184 are preferably areas of metal which are plated on board 180. Films 182, 184 have respective faces 190, 192, which are disposed in a plane that is parallel to a plane including X-axis 20 and Z-axis 24. Faces 190, 192 are separated from float face 70 by a gap 194, which is of substantially uniform thickness when float 18 is in its null position, that is when Y-axis 16 is disposed substantially at right angles to a plane including X-axis 20 and Z-axis 24. In one sample of embodiment 10, gap 194 has a thickness at null condition equal to about 0.002 inch.

Pickoff 32 assumes a null position with a substantially constant gap 194 at a substantially constant velocity of vehicle 12; and pickoff 32 assumes a hang-off position with a tapered gap 194 at an acceleration of vehicle 12.

Pickoff 32 has a remote, externally-mounted servo amplifier 196 (FIG. 1), which is operatively connected through block 172 to torquer 34 for providing an amplified error signal thereto that rotates shaft 144 and casing 22 about Z-axis 24 for recording each acceleration affected thereon and for precessing float 18 back to its null position.

With the construction of pickoff 32, a three-plate variable type of capacitor is provided, in which float face 70 acts as a movable plate cooperating with stationary capacitor films 182, 184, and in which the ratios of weight-to-level of null stabiltiy and of weight-to-level of strength and durability are minimized.

In addition, with the construction of pickoff 32, conventional flex leads interconnecting float 18 and casing 22 are eliminated, and further, electrical reaction forces between float 18 and casing 22 are also minimized.

Torquer 34, which is controlled by pickoff 32 and which is preferably a DC permanent magnet type of torquer, includes an annular stator 198, which is fixedly connected to the radially-inner side of wall 154 and which consists of a stack of magnetically permeable plates. Torquer 34 also includes an annular rotor 200, which is fixedly connected to the radially-outer side of shaft 144 and which consists of permanent magnets.

Stator 198 has a printed circuit commutator 202 of the type which is fully described in U.S. application Ser. No. 406,426, filed Oct. 26, 1964, now Pat. No. 3,310,694 assigned to the same assignee as in this invention.

Wall 154 and inner flanges 158, 160 form a return path of U-shaped cross-section enclosing stator 198 for minimizing flux leakage from rotor 200 and also for magnetically shielding the rotor 200 and stator 198.

Torquer 34 has the function of rotating shaft 144 and casing 22 about Z-axis 4 relative to wall 154 and vehicle 12, upon receiving a signal from pickoff 32 that indicates an acceleration-induced rotation of float 18 about X-axis 20, and for returning float 18 by precession back to its null position.

Figure 2:
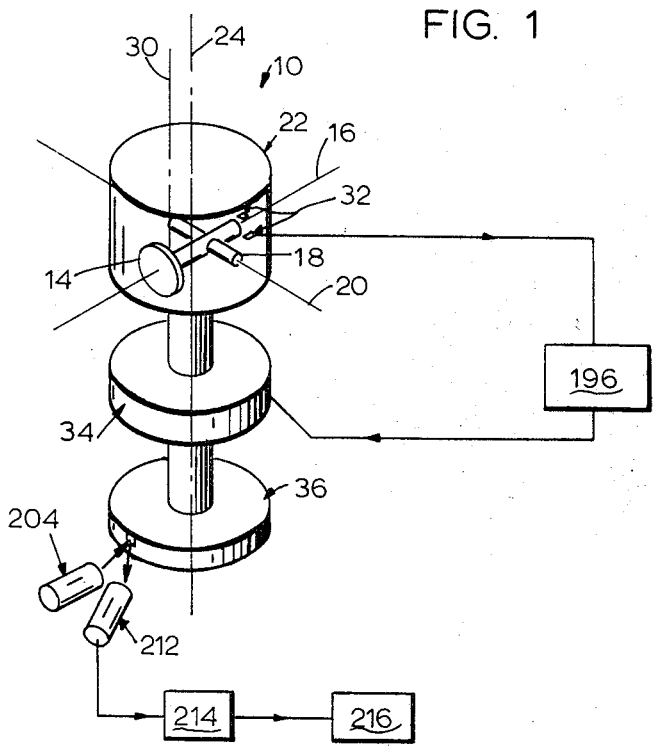
FIG. 2 is a schematic representation of FIG. 1.
Figure 3:
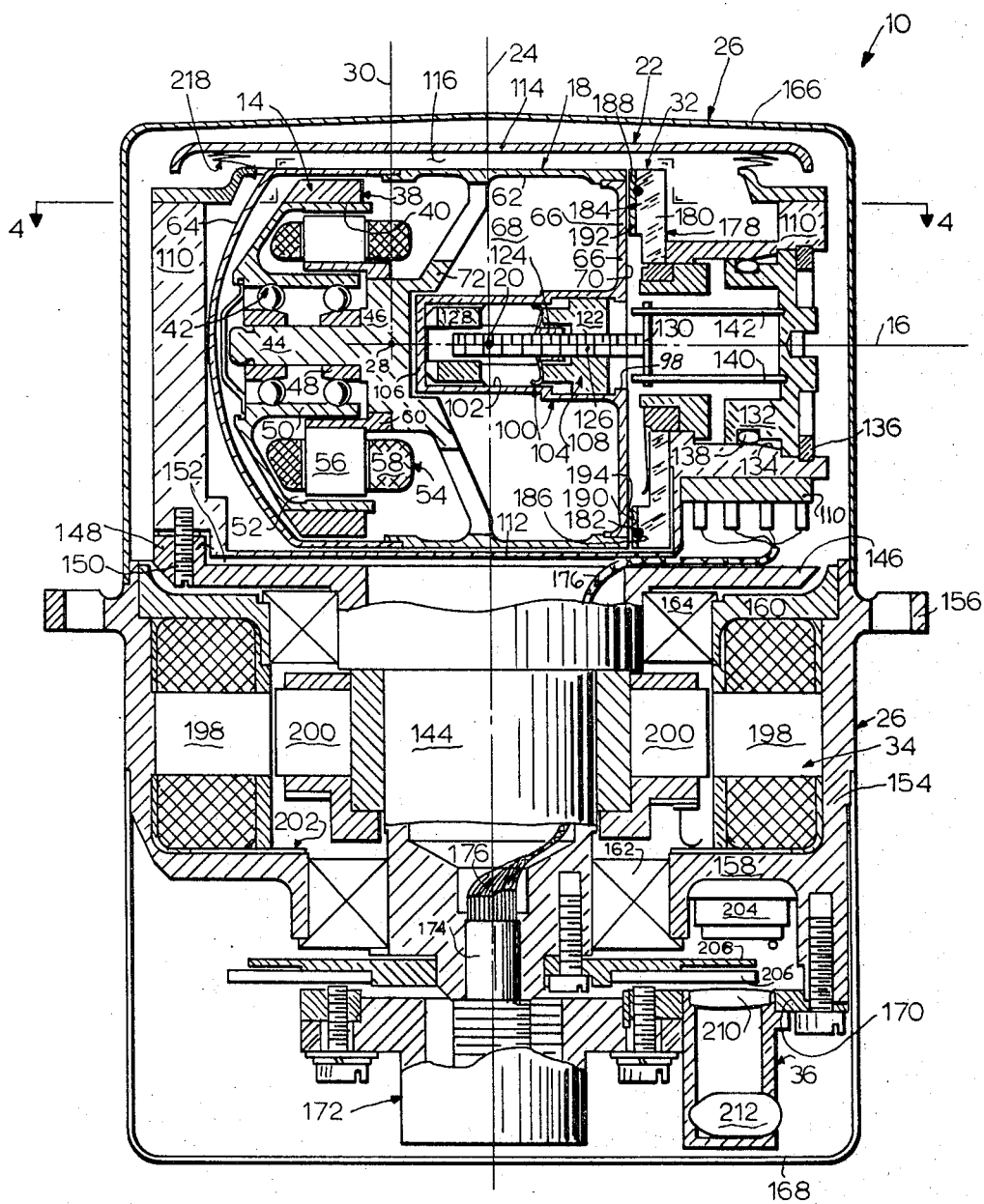
FIG. 3 is a sectional view of the gyro illustrated in FIG. 1.
Figure 4:
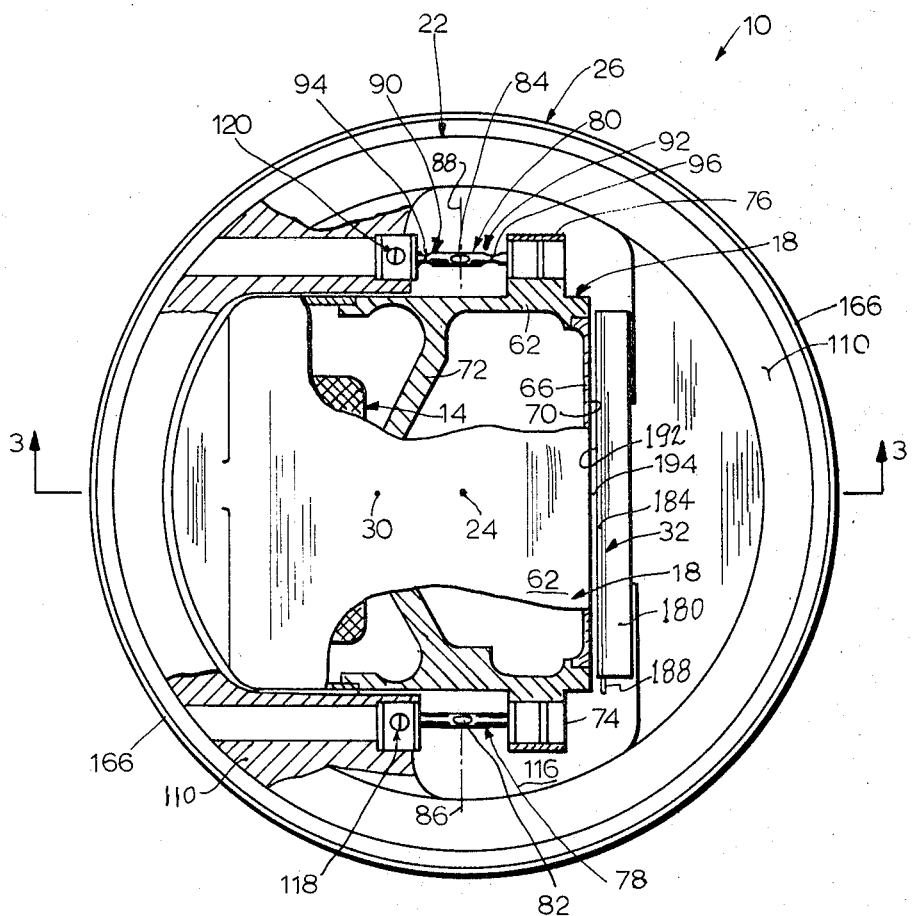
FIG. 4 is a sectional view as taken on line 4—4 of FIG. 3.

Digital transducer 36, which is a digital-angle encoder, includes a plurality of photocells 204 that are mounted on flange 158, a fixed code disc 206 that is connected to wall 154, and a rotating code disc 208 that is connected to shaft 144. Each photocell 204 cooperates with an axially-opposite collimating lens 210 and a light source 212 that are mounted on end plate 170. Photocells 204 also connect to a standard pulse generator 214 (FIG. 2), which provides a train of electrical pulses to a system computer 216. The net quantity or sum of pulses to computer 216 measures the instantaneous velocity of vehicle 12 and the sum of the pulses divided by the time period or the pulse rate measures the acceleration of vehicle 12. The construction of this type of transducer 36 is more fully described in U.S. Pat. Nos. 2,993,200 and 2,995,705, which are assigned to the same assignee as in this invention.

A bellows ring 218 is also provided in gyro 10, which is concentric about Z-axis 24 and which connects wall 110 to plate 114 so that casing cavity 116 has a variable-volume capacity that automatically adjusts to temperature-induced volumetric changes of the damping fluid therein.

In summary, with the construction of gyro 10, the ratio of gyro weight-to-level of accuracy, performance and stability is minimized. In addition, the ratio of float weight-to-pendulosity is minimized. Moreover the ratio of rotor weight-to-momentum is minimized. Furthermore, with the construction of float 18 and casing 22, pickoff 32 can have a construction in which the ratio of pickoff weight-to-level of performance is minimized. Further, with the construction of rotor 14, float 18 and pendulosity-adjusting balance means 108, slight mass shifts in gyro 10 are minimized, whereby gyro 10 has improved pendulosity, constancy and scale factor.

What is claimed is:
1. In an acceleration integrating gyro comprising:
a rotor rotatable about a first axis;
a float gimbal pivotable about a second axis intersecting the first axis substantially at right angles thereto having a peripheral wall coaxial with the rotor along the first axis with means supporting the rotor for rotation of the rotor about the first axis and having a pair of end walls axially-spaced along first axis forming a cavity for enclosing said rotor, the rotor and gimbal float being offset from the second axis for making the float pendulous;
a casing gimbal pivotable about a third axis disposed substantially at right angles to the second and having a peripheral wall concentric about the third axis with pivot means supporting the float for pivoting of the float relative to the casing about the second axis and having a pair of end walls axially-spaced along the third axis forming a cavity for containing a damping fluid for immersing the float therein;

a support gimbal having an axis parallel to the third axis and having pivot means for pivoting the casing relative thereto about the third axis;

capacitive pickoff means with one pickoff portion mounted on the float and with another cooperating pickoff portion mounted on a portion of the casing disposed adjacent thereto for sensing tilt of the float from its null position relative to the casing; and, a torquer on said support gimbal for pivotally rotating the casing relative thereto, said torquer being operatively connected to and controlled by said capacitive pickoff so that the float can be precessed back to a null condition after being subjected to an acceleration-induced pivoting relative to said casing;

the improvement therein wherein the support gimbal has a cylindrical peripheral wall concentric about third axis and axially spaced from the casing gimbal with a radially outer surface connecting to a vehicle and with a radially inner surface having a pair of axially-spaced ball bearings;

a shaft being journaled in said bearings for rotation relative to said peripheral wall with one end of said shaft fixedly connected to said casing gimbal; and, said torquer is disposed between said bearings coaxially therewith with its stator mounted on said radially inner surface of said peripheral wall and with its rotor mounted on the adjacent surface of said shaft.

2. A gyro as claimed in claim 1, in which the support gimbal has a digital transducer with a stator mounted on its peripheral wall and with a rotor mounted on said shaft for sensing total angular displacement of said casing relative to said support gimbal.

3. A gyro as claimed in claim 1, in which:

said support gimbal has a digital transducer with a stator mounted on said support gimbal peripheral wall and with a rotor mounted on said support gimbal shaft for measuring the angle of displacement of the casing gimbal relative to the support gimbal and thereby computing the integral of the acceleration applied on the gyro.

References Cited

UNITED STATES PATENTS

| | | | |
|---|---|---|---|
| 2,618,159 | 11/1952 | Johnson et al. | 74—5 |
| 2,903,891 | 9/1959 | Sedgfield | 74—5.4 |
| 2,925,590 | 2/1960 | Boltinghouse et al. | 340—200 |
| 3,003,356 | 10/1961 | Nordsieck | 74—5 |
| 3,290,949 | 12/1966 | Samet | 74—5 |

ROBERT F. STAHL, Primary Examiner

U.S. Cl. X.R.

74—5.6